US012697609B2

(12) United States Patent     (10) Patent No.:   US 12,697,609 B2

Shahar et al.     (45) Date of Patent:    Aug. 4, 2026

(54) PIPETTOR CALIBRATION SYSTEM DEVICES AND METHODS THEREOF

(71) Applicants: Dan Yehoshoa Shahar, Lehavim (IL); Itzhak Shafir, Hoshaya (IL)

(72) Inventors: Dan Yehoshoa Shahar, Lehavim (IL); Itzhak Shafir, Hoshaya (IL)

(73) Assignees: Dan Yehoshoa Shahar, Lehavim (IL); Itzhak Shafir, Lehavim (IL)

( * ) Notice: Subject to any disclaimer, the term of this patent is extended or adjusted under 35 U.S.C. 154(b) by 1159 days.

(21) Appl. No.: 17/422,871

(22) PCT Filed: Jan. 15, 2020

(86) PCT No.: PCT/IL2020/050066

§ 371 (c)(1),
(2) Date: Jul. 14, 2021

(87) PCT Pub. No.: WO2020/148764

PCT Pub. Date: Jul. 23, 2020

(65) Prior Publication Data

US 2022/0097037 A1     Mar. 31, 2022

Related U.S. Application Data

(60) Provisional application No. 62/793,471, filed on Jan. 17, 2019.

(51) Int. Cl.
*B01L 3/02*       (2006.01)
*G01N 35/00*      (2006.01)

(52) U.S. Cl.
CPC .......... *B01L 3/021* (2013.01); *G01N 35/0099* (2013.01); *B01L 2200/148* (2013.01)

(58) Field of Classification Search
CPC .. B01L 3/021; B01L 2200/148; B01L 3/0217; B01L 3/02; G01N 35/0099;

(Continued)

(56) References Cited

U.S. PATENT DOCUMENTS

| | | | |
|---|---|---|---|
| 3,612,434 A | 10/1971 | Johnson | |
| 5,343,769 A | 9/1994 | Suovaniemi et al. | |

(Continued)

FOREIGN PATENT DOCUMENTS

| | | |
|---|---|---|
| CN | 106799266 | 6/2017 |
| CN | 106840300 | 6/2017 |

(Continued)

OTHER PUBLICATIONS

Ibrahim et al., Effect of Pipette Calibration on Quality Control Results in Khartoum State 2014, Sch. J. App. Med. Sci., 2015; 3(7A): 2457-2460 (Year: 2015).*

(Continued)

*Primary Examiner* — Maris R Kessel
*Assistant Examiner* — Valerie Simmons
(74) *Attorney, Agent, or Firm* — Mark S Cohen; Pearl Cohen LLP

(57) ABSTRACT

Methods and systems configured to automatically calibrate a pipette to a reference standard. The system comprising: a robotic arm, a pressing-device, configured to firmly hold a pipette and to press a plunger-button of the pipette, a rotating-device configured to rotate/dial a wheel-button of the pipette, at least one liquid source, at least one scaling element, at least one input-device configured to receive real-time input-data, and at least one processor, in communication with the input-device configured to analyze the input-data and accordingly to: control the motion of the robotic arm, control the rotating-device, control the pressing-device, evaluate calibration of the pipette, in reference to a chosen standard, and output a calibration report for the pipette.

20 Claims, 14 Drawing Sheets

(58) Field of Classification Search

CPC ..... G01N 35/00693; G01N 2035/0405; G01N 2035/1093; G01N 35/109; G01N 35/1016

See application file for complete search history.

(56) References Cited

U.S. PATENT DOCUMENTS

| 5,638,149 | A | 6/1997 | Machemer et al. | |
| 6,576,477 | B1* | 6/2003 | Tokiwa | B01L 3/021 |
| | | | | 422/62 |
| 2002/0124627 | A1* | 9/2002 | Luchinger | G01N 35/00693 |
| | | | | 141/130 |
| 2005/0013673 | A1 | 1/2005 | Tucker | |
| 2005/0182609 | A1 | 8/2005 | Kurrle et al. | |
| 2007/0297279 | A1* | 12/2007 | Gao | B01F 33/84 |
| | | | | 366/160.4 |
| 2009/0000351 | A1 | 1/2009 | Magnussen et al. | |
| 2009/0016852 | A1* | 1/2009 | Yuyama | G07F 17/0092 |
| | | | | 414/1 |
| 2009/0142844 | A1 | 6/2009 | Le Comte | |
| 2013/0026965 | A1 | 1/2013 | Yoshitake et al. | |
| 2013/0280143 | A1* | 10/2013 | Zucchelli | B25J 9/1697 |
| | | | | 422/501 |
| 2018/0133893 | A1 | 5/2018 | Motojima et al. | |
| 2018/0154349 | A1 | 6/2018 | Habbal | |

FOREIGN PATENT DOCUMENTS

| CN | 106840300 | A | | 6/2017 | | |
| CN | 107115905 | | | 9/2017 | | |
| CN | 107115905 | A | | 9/2017 | | |
| CN | 107917747 | | | 4/2018 | | |
| DE | 102014213438 | | | 1/2016 | | |
| DE | 102014213438 | A1 | | 1/2016 | | |
| EP | 1299033 | B1 | | 4/2003 | | |
| EP | 1299033 | | | 8/2009 | | |
| EP | 3385719 | | | 10/2018 | | |
| GB | 2536468 | | | 9/2016 | | |
| GB | 2536468 | A | | 9/2016 | | |
| JP | H0755815 | | | 3/1995 | | |
| JP | H0755815 | A | * | 3/1995 | | |
| KR | 20120124689 | A | * | 11/2012 | ........... | B01L 3/0217 |

OTHER PUBLICATIONS

Supplementary European Search Report issued for EP Application No. EP 20740858 dated Feb. 24, 2023.

International Search Report and Written Opinion issued for International Application No. PCT/IL2020/050066 dated Mar. 10, 2021.

International Search Report and Written Opinion of the International Searching Authority dated Mar. 10, 2021, issued for the corresponding PCT International Application No. PCT/IL2020/050066, dated Jan. 15, 2020.

* cited by examiner

444

410

Figure 5A:
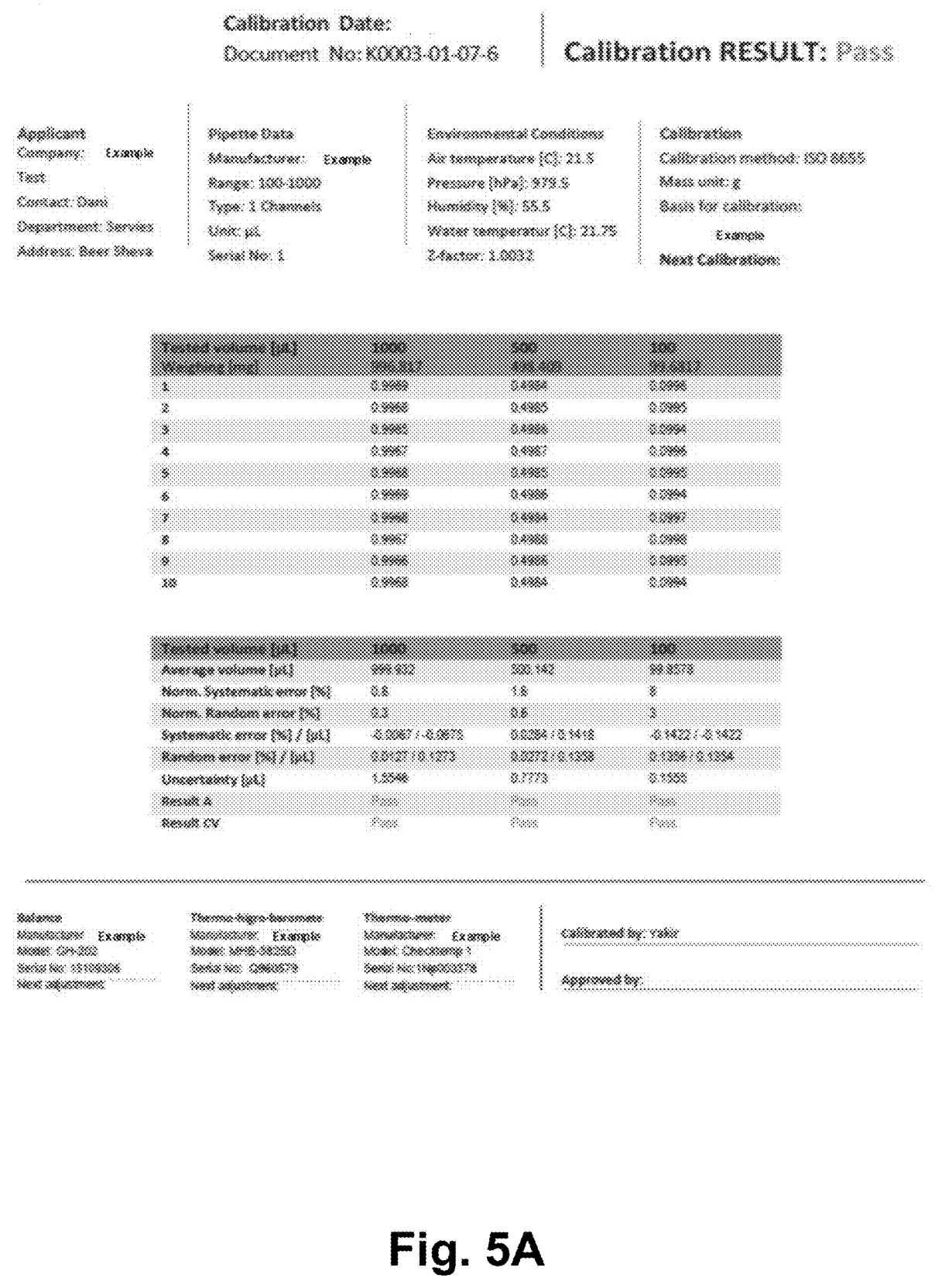

Calibration Date:
Document No: K0003-01-07-6

Calibration RESULT: Pass

Applicant
Company: Example
Test
Contact: Dani
Department: Service
Address: Beer Sheva Pipette Data
Manufacturer: Example
Range: 100-1000
Type: 1 Channels
Unit: µL
Serial No: 1

Environmental Conditions
Air temperature [C]: 21.5
Pressure [hPa]: 979.5
Humidity [%]: 55.5
Water temperature [C]: 21.75
Z-factor: 1.0032

Calibration
Calibration method: ISO 8655
Mass unit: g
Basis for calibration:
   Example
Next Calibration:

PIPETTOR CALIBRATION SYSTEM DEVICES AND METHODS THEREOF

CROSS-REFERENCE TO RELATED APPLICATIONS

This application is a National Phase Application of PCT International Application No. PCT/IL2020/50066, International Filing Date Jan. 15, 2020, claiming priority of U.S. Provisional Patent Applications No. 62/793,471, filed Jan. 17, 2019, which are hereby incorporated by reference.

BACKGROUND OF THE INVENTION

A pipette, a pipettor, or a pipet is a hand-held device used to transfer or provide a small and accurate amount of fluids, usually used in chemical and biological laboratories. The pipette is the most basic tool used in each laboratory. Every person who begins to work in the lab, in the framework of studies, research or work, is trained to use a pipette. A number of such pipettors can usually be found in each laboratory. Currently, there is no organized, consistent and uniform training procedure for use with pipettors and no follow-up for a uniform certification. Each laboratory and each organization train and use pipettors according to their understanding and discretion.

Every procedure in a chemical or a biological laboratory begins with the use of a pipettor. Procedures such as PCR, Elisa crystallography, etc. involve high-tech systems and very expensive equipment. All these processes begin by manually preparing the sample and working with the pipettors. Many deviations in the results can be prevented by calibrating and checking the pipettor regularly (the recommendation is between once a week to once a month), and by a proper technique for the pipettor use practiced by laboratory employees. Currently, the laboratories do not have a means for calibrating pipettors, and there is no standard guidelines of training of laboratory workers for proper use of pipettor and proper testing for the pipettors. Most laboratories calibrate pipettors once a year, while only a small number of laboratories perform calibration to the pipettors more frequently, such as once a month (e.g. in the field of baby food and pharmaceutical industry). In any event, this scope of calibration is not sufficient to maintain equipment service and as a result, the likelihood of errors and mistakes in the lab's work increases.

There are several factors that affect the quality of the work with pipettors in the laboratory:

The laboratory technician pipettor's use technique: this factor is responsible for a large part of a pipettor's use mistakes. The technique must be adapted to the required application and implemented with precision. Today there is very little follow-up, if any, for mistakes arising from incorrect use of a pipettor.

The tip, which is configured for leading the fluid from the pipettor to the test, should be suitable for pipettor type/model, to the type of work it performs and to the quality required. When one replaces the type of tip, the pipettor must be recalibrated to adjust the tip to pipettor and verify a proper result.

Environmental conditions: temperature, barometric pressure, humidity.

A mechanical malfunction in the pipettor or lack of pipettor's calibration. The pipettor is a delicate and complex mechanical instrument that may not be calibrated with a significant portion of the time. Every drop down and even a careless laying of the pipettor on a table, at the end of a job, can take it out of calibration, but since there is no effective and quick way to perform calibration to these devices, these are usually ignored.

There are different methodologies for determining the required calibration level of the pipettors. One of them uses the desired level of reliability and the mean time between failures (MTBF) index to determine how often a calibration is needed. The reliability level describes the percentage of proper pipettors in the lab at a given moment. For example, the meaning of 95% reliability is that at any given time 95% of the pipettors in the laboratory should be normal and calibrated, while only 5% can be malfunctioned.

A laboratory manual calibration of a pipettor is conducted in a controlled temperature environment and under precise working procedures. Usually ten weight measurements are conducted, per three different liquid volumes (10% of the full volume, 50% and 100%), for each pipettor. Total is usually 30 measurements, per a pipettor. The liquid measurement is performed on an accurate weight scale having accuracy of $10^{-6}$ gram, usually using a display of 4 to 6 digits. The pipettor's volume is adjusted by rotating the wheel-button, for each of the required liquid volumes. Since the calibrating is conducted manually, there can be a difference in the calibration features between one calibrating employee and to another, even at the same laboratory.

There are many factors that affect manual calibration quality: the equipment, the workspace, hand stability of the calibrating person, grip orientation of the calibrating person (perpendicular or tilted), the warmth of the hand of the calibrating person, fatigue of the calibrating person and environmental conditions (like: temperature, humidity, tip selection, and liquid quality). At the end of the manual calibrating process, the pipette is calibrated and found within the deviation limits permitted by a standard, for example ISO8655, however the process is manual, slow, non-repeatable and requires the preservation of a specific working environment and specific and controlled work conditions. As a result, the calibration process of one pipettor by an experienced calibrator takes approximately 30-45 minutes. The calibration of a multi-channel pipettor takes about 2 to 4 hours. When it comes to a large laboratory having hundreds and thousands of pipettors, the calibration is usually performed through a company that provides the service to this laboratory and not by the laboratory's staff.

In this context, the exhaustion factor among technicians should be mentioned, dealing with pipettors calibration continuously in a large part of their work day. Technicians in companies providing pipettors calibration services for laboratories, are intensively engaged in manual calibration process. Some of the companies are aware of the cause of exhaustion and limit the number of pipettors calibration per an employee, for one day's work. This is to reduce the effect of exhaustion (fatigue) on the results of the calibration. While most often, the calibration of a pipettor is within the required range, the dispersion of the measurement is too large.

Most of the pipettors in laboratories are in volumes of 20-1000 micro-liters. These pipettors' calibration requires a weight precision of about $10^{-5}$ gram. About 15% of the pipettors are 8 multi-channel or 12-multi channel pipettors that are bound together (usually used for a case of plurality of test tubes). About 10% are small pipettors of having a volume of 0.1-20 micro-liter. The calibration of such small pipettors requires a weight scale in the rank of $10^{-6}$ gram and requires a touch of the tip with the tool wall or a paper surface, to dispense the liquid drop onto the weight scale.

SUMMARY OF THE INVENTION

According to embodiments of the invention, a new pressing-device is provided configured to push a button of a pipette, comprising:

a firm base, a linear actuating-device firmly connected to the base, and configured to provide linear motion and a force (F1), via its actuating-lever;

a pressing-lever, connected at a proximal-section thereof to the actuating-lever, and configured to temporarily communicate, via a distal-section thereof, with the button and therefore apply a force (F2 or F3) on the button.

According to some embodiments, the pressing-lever is connected at the proximal-section thereof to the actuating-lever via an axis-pin; and wherein the pressing-lever is connected to the base, via another axis-pin, at a predetermined location of the pressing-lever, configured to provide a predetermined force relation between the force (F1) applied at the proximal section and the force (F2) applied at the distal section.

According to some embodiments, pressing-device the further comprising at least one spring configured to control and/or restrain the motion of the actuating-lever, such that the force (F3), which is applied onto the plugger-button depends on the spring's stiffness coefficient (k) and the spring's deformation length, due to the motion of the actuating-lever According to some embodiments, the distal-section of the pressing-lever further comprises a wheel or a ball in a socket, configured for the temporary communication of the pressing-lever with the button.

According to some embodiments, the actuating-lever comprises a piston-spacer, configured to reduce the amplitude of the actuating-lever's motion.

According to some embodiments, the pressing device is configured to be firmly connected to a robotic arm, as an end effector thereof.

According to some embodiments, the pressing-device further comprises at least one processor, configured to control the actuating-device.

According to some embodiments, the linear actuating-device further comprises an analog location tracker, in communication with the processor, configured to measure the motion of the actuating-lever.

According to some embodiments, the pressing-device further comprising a pressure regulator, in communication with the processor, configured to measure and control the applied force (F1), at the proximal section of the pressing-lever.

According to some embodiments, the pressure regulator is configured to control the applied force (F1) and thereby the applied force (F2 or F3) to push the button to a first stop and/or a second stop thereof.

According to some embodiments, the applied force (F2 or F3) is selected between 0 to 11 Kg.

According to some embodiments, the resolution of the applied force (F2 or F3) is selected between 0.001 to 0.5 Kg.

According to some embodiments, the pressing-device further comprising a gripping-device, firmly connected to the base and configured to firmly and temporarily hold the pipette.

According to some embodiments, the griping-device comprises at least one of:

rigid jaws or rigid claws, configured grasp by direct impact upon pipette;

at least one attraction-element configured to temporarily provide attraction forces applied to the pipette surface, forces selected from: vacuum, magneto-adhesion, or electro-adhesion;

at least one adhesion-element configured to be temporarily attached to the pipette by: a glue or surface tension; and any combination thereof.

According to some embodiments of the invention, a new rotating-device is provided configured for turn/dial a button of a pipette, comprising:

a firm base;

a rotary-motor, configured to provide a rotary motion and moment (M);

at least one active-wheel, in rotary communication with the rotary-motor, configured to apply the moment (M) onto the button and turn/dial the button; and a coupling-assembly mounted via a rail on the base, configured to carry the rotary-motor and the at least one of the active-wheels and to couple the active-wheel/s to the button and/or to separate the active-wheel/s from the button, and therefore to control the application of the moment (M) onto the button.

According to some embodiments, the coupling-assembly comprises two opposing-sections, the first-section is configured to carry the rotary-motor and at least one of the active-wheels, and the second-section is configured to carry another active-wheel or a passive-wheel, and wherein the coupling-assembly is configured to couple all the wheels from two sides of the button.

According to some embodiments, the coupling-assembly further comprises a compression-spring configured to bring the two opposing-sections one towards the other, and therefore to apply a compression-force onto the button.

According to some embodiments, the coupling assembly further comprises a piston comprising a piston-lever; the piston-lever is located between the two opposing-sections, configured to separate the two opposing-sections, when the piston-lever protrudes out of the piston.

According to some embodiments, the active-wheel and/or the passive-wheel is mounted to the coupling-assembly via a spring/s, configured to allow motion along the axis of the wheel/s.

According to some embodiments, the active-wheel and/or the passive-wheel comprises rubber.

According to some embodiments, the rotating-device further comprising at least one processor configured to control the rotary-motor and/or the coupling-assembly, therefore to control the rotation/dialing of the button.

According to some embodiments, the rotating device further comprising a least one imaging-sensor, in communication with the processor, configured to image digits of a volume indicator of the pipette and optionally its indicated measuring unit, and optionally wherein the processor is further configured to analyze the provided image and to control the rotation of the button, based on the analyzed image, to a predetermined value.

According to some embodiments, the rotating device further comprising illumination element, configured to illuminate the volume indicator.

According to some embodiments, the rotating-device further comprising a gripping-device, firmly connected to the firm base and configured to firmly and temporarily hold the pipette.

According to some embodiments of the invention, a new system is provided configured to automatically calibrate a pipette, comprising:

a robotic arm, configured to translate and rotate its end effector;

a pressing-device firmly connected to the robotic arm, to serve as its end effector, the pressing device configured to hold a pipette and to press a plunger-button of the pipette;

a rotating-device, configured to rotate/dial a wheel-button of the pipette;

at least one liquid source;

at least one scaling element, configured to measure weight;

at least one input-device, configured to receive real-time input-data; and at least one processor, in communication with the input-device configured to analyze the input-data and accordingly to:

control the motion of the robotic arm, therefore control location and orientation of the pipette;

control the rotating-device, therefore control a rotation angle/dialing applied onto the wheel-button;

control the pressing-device, therefore control pressure applied onto the plunger-button and control the gripping and release of the pipette;

evaluate calibration of the pipette, in reference to a predetermined standard; and output a calibration report for the pipette.

According to some embodiments, the system is provided within a closed cabin, with an optional exception of at least some of the processors; the cabin is configured to enable environment control there within.

According to some embodiments, the robotic arm comprises at least four rotational degrees of freedom (DOF).

According to some embodiments, the input-device comprises at least one of: a keyboard, a scanner, a touch screen, a microphone, a camera, a temperature sensor, a humidity sensor, a illumination sensor, a water density sensor, a sensor which determines the liquid quantity at the liquid source, the scaling element, an atmospheric pressure sensor, and any combination thereof, configured to collect data about the pipette features and/or the systems features.

According to some embodiments, the input-device comprises at least one imaging-sensor, configured to take image/s of the pipette.

According to some embodiments, the processor is further configured to evaluate a required rotation-angle or dialing, based on a received and analyzed image of digits of a volume indicator and optionally an indicated measuring unit.

According to some embodiments, the system further comprising at least one illumination element, configured to illuminate at least the volume indicator of the pipette.

According to some embodiments, the input-device comprises at least one illumination sensor; and wherein the processor is further configured to control the illumination element.

According to some embodiments, the system further comprising at least one temperature control device, configured to adjust the cabin's temperature and/or the liquid's temperature in the liquid source; the input-device comprises at least one temperature sensor; and the processor is further configured to control the temperature control device to a predetermined temperature.

According to some embodiments, the system further comprising at least one humidity control device, configured to adjust the cabin's humidity; the input-device comprises at least one humidity sensor; and the processor is further configured to control the humidity control device to a predetermined humidity.

According to some embodiments, the input-data comprises at least one of:

at least one reference standard, to be provided as the predetermined standard;

weight, volume, and/or dimensions of the liquid source/liquid tank;

identification data of the pipette;

at least one image of the pipette, received from an imaging sensor;

at least one current image of the pipette's volume indicator, received from an imaging sensor;

current illumination intensity, received from an illumination sensor;

current cabin's temperature, received from a temperature sensor;

current liquid temperature in the liquid source, received from a temperature sensor;

current cabin's humidity, received from a humidity sensor;

current location and orientation of the pipette, received from a processor of the robotic arm;

current liquid weight, received from the scaling element;

current atmospheric pressure;

calculated Z factor;

current water density; and any combination thereof.

According to some embodiments, the system further comprises at least one display device, configured to display the input data and/or the calibration report.

According to some embodiments, the plunger-button and the wheel-button are configured as a single button.

According to some embodiments, the report comprising selected from: pass, fail, need adjustment, check for mechanical malfunction, and combination thereof.

According to some embodiments of the invention, a new method is provided for automatic calibration of at least one pipette using the system according to the above mentioned, the method comprising:

receiving the input-data, via the at least one input-device;

holding and/or releasing a pipette, via the pressing-device;

moving the pipette to a predetermined location and/or orientation, via the robotic arm;

applying a predetermined rotation angle onto a wheel-button of the pipette, via the rotating-device;

applying a predetermined pressure onto a plunger-button of the pipette, via the pressing-device;

measuring liquid weight, via the scaling element;

evaluating a calibration of the pipette, in reference to a predetermined standard, via the processor; and providing a calibration report for the pipette, via the processor and a display device.

According to some embodiments, the step applying a predetermined rotation angle onto a wheel-button, comprises selecting a liquid volume for the pipette.

According to some embodiments, the step of selecting a liquid volume for the pipette comprises analyzing, via the processor, an image of a volume indicator of the pipette, provided by an imaging sensor.

According to some embodiments, the step of applying a predetermined pressure onto the plunger-button, comprises drawing liquid from the liquid source into the pipette.

7

According to some embodiments, the step of applying a predetermined pressure onto the plunger-button, comprises dispensing the liquid from the pipette onto the scaling element.

According to some embodiments, the steps of drawing, dispensing, and measuring, are repeated in cycles, for a predetermined number of times, per several predetermined selected liquid volumes; and wherein the step of evaluating is based on a selected collection of the repeated cycles.

According to some embodiments, the selecting of the collection of cycles, is based on statistic tools selected from: standard deviation, measurement random error, measurement uncertainty, etc.

According to some embodiments, the method further comprising at least one step selected from:

controlling temperature of the cabin and/or of the liquid in the liquid source, via at least one temperature sensor and at least one temperature control device;

controlling humidity of the cabin, via at least one humidity sensor, and at least one humidity control device;

controlling the illumination onto a volume indicator of the pipette, via at least one illumination sensor and at least one illumination element;

sterilizing the pipette via an ultra violet radiation device;

selecting a tip to be applied onto the pipette, according to the type of the pipette and its task;

collecting and applying tip onto the pipette, via the robotic arm;

ejecting the tip from the pipette;

removing used liquid from the container;

displaying the input data and/or the calibration report, via the displaying-device and/or via the printing device; and and any combination thereof.

According to some embodiments, the method further comprising collecting a pipette from a predetermined location and/or driving out the pipette to a predetermined location, via the controlling of the robotic arm and the pressing device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 5A and 5B demonstrate examples for calibration reports; in FIG. 5A and example for a positive result and in FIG. 5B and example for a negative result, according to some embodiments of the invention.

8

Figure 1A:
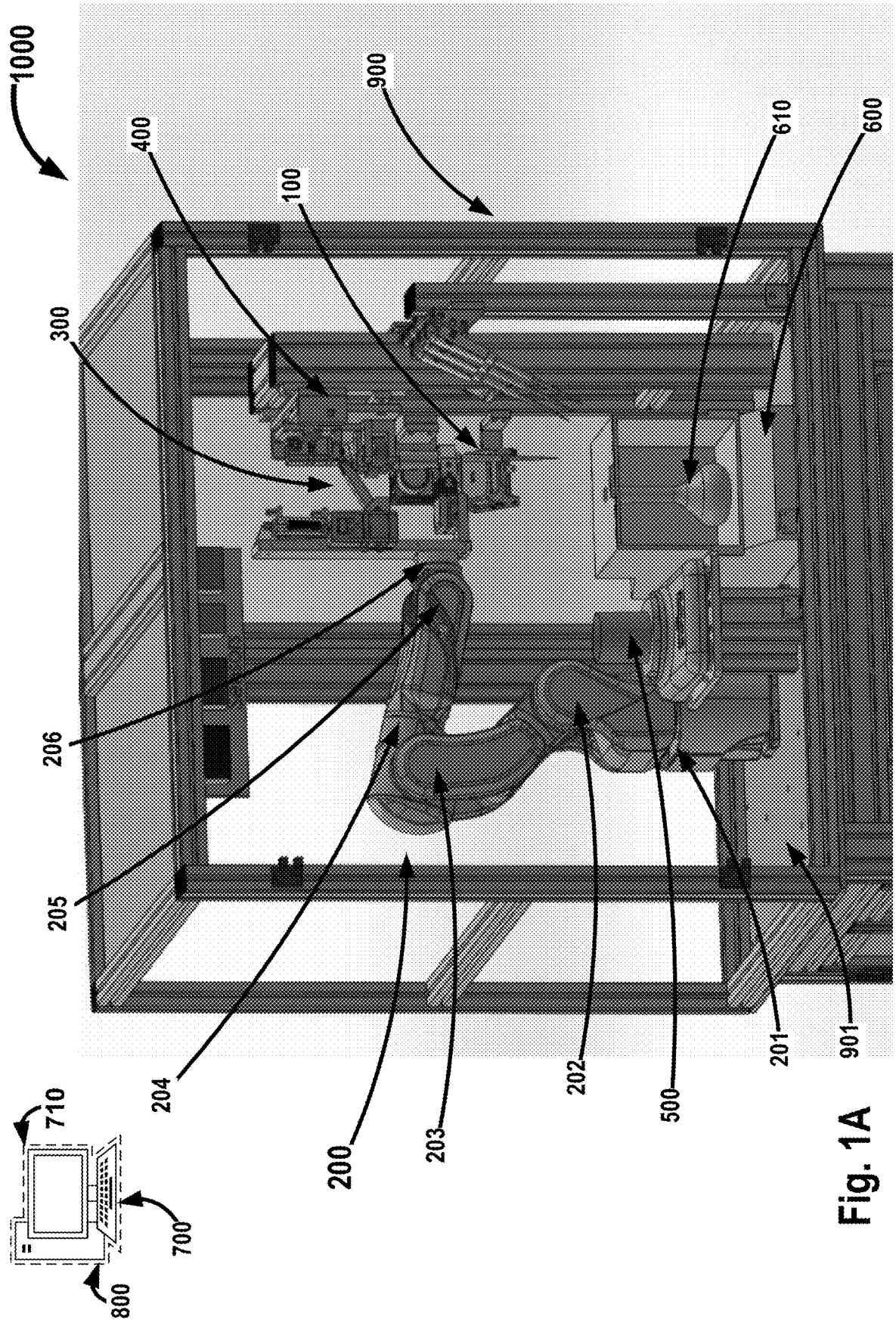
FIGS. 1A, 1B, and 1C schematically demonstrate a new system, configured to automatically calibrate a pipette, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terms "calibrate" and "calibration", as used herein refers, according to some embodiments, to a process configured to standardize (something, such as a measuring instrument) by determining the deviation from a standard, so as to ascertain the proper correction factors.

The term "firm", as used herein refers, according to some embodiments, to having a solid or compact structure that resists stress or pressure or force moment. The term "firmly" as used herein refers, according to some embodiments, to securely or solidly fixed in place while resisting stress or pressure or force moment.

The term "end effector", as used herein refers, according to some embodiments, to a device at the end of a robotic arm, designed to interact with the environment.

According to some embodiments, the term "button" as used herein, can be replaced with the term "knob".

Reference is now made to FIGS. 2A, 2B, 2C, 2D, 2E and 2F, which schematically demonstrate a new pressing-device 300 configured to push a plunger-button 130 of a pipette, according to some embodiments of the invention, while the pipette is being held firmly.

According to some embodiments, the pressing-device 300 comprises:

a firm base 310, a linear actuating-device 340 firmly connected to the base, and configured to provide linear motion and a force (F1), both in the same direction, via its actuating-lever 341;

a pressing-lever 350, connected at a proximal-section thereof 351 to the actuating-lever 341, via an axis-pin 371, and optionally via a connector 344; the pressing-lever is configured to temporarily communicate, via a distal-section thereof 352, with the plunger-button and therefore apply a force (F2) on the plunger-button; wherein the pressing-lever is connected to the firm base, via an axis-pin 373, at a predetermined location of the pressing-lever 353, configured to provide a predetermined relation between the force (F1) applied at the proximal section and the force (F2) applied at the distal section 352.

According to some embodiments, the force (F2) is provided by the linear actuating-device, according to the equivalent force moments, $M=F1\times R1=F2\times R2$, therefore the relation is $F2=F1\times R1/R2$. According to some embodiments, R1 is the distance between the proximal-section 351 and the predetermined location 353 and R2 is the distance between the distal-section 352 and the predetermined location 353, as demonstrated in FIG. 2C.

Figure 2A:
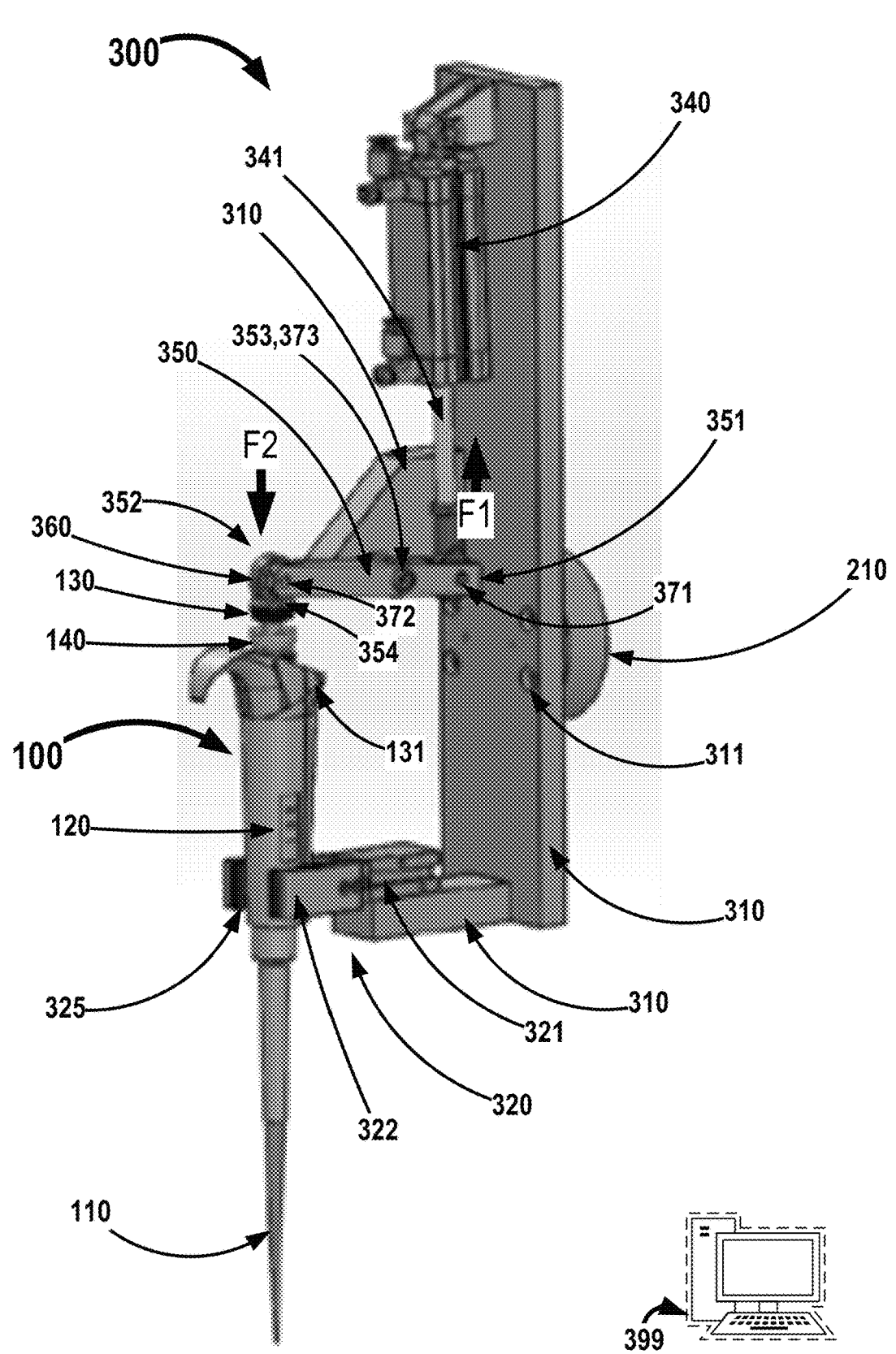
FIGS. 2A, 2B, 2C, 2D, 2E and 2F schematically demonstrate a new pressing-device configured to push a plunger-button of a pipette, according to some embodiments of the invention.
Figure 2B:
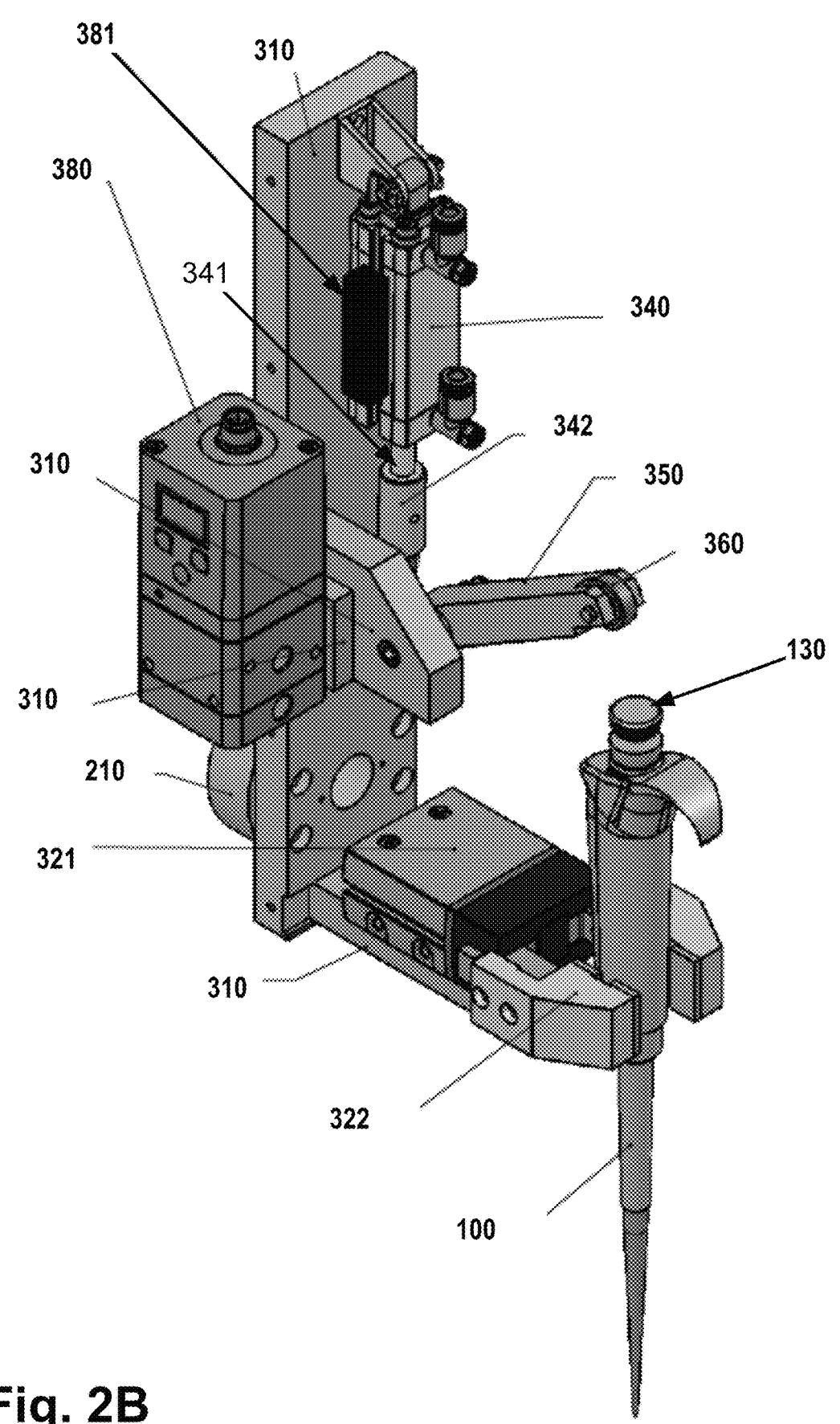
Figures 2C, 2D:
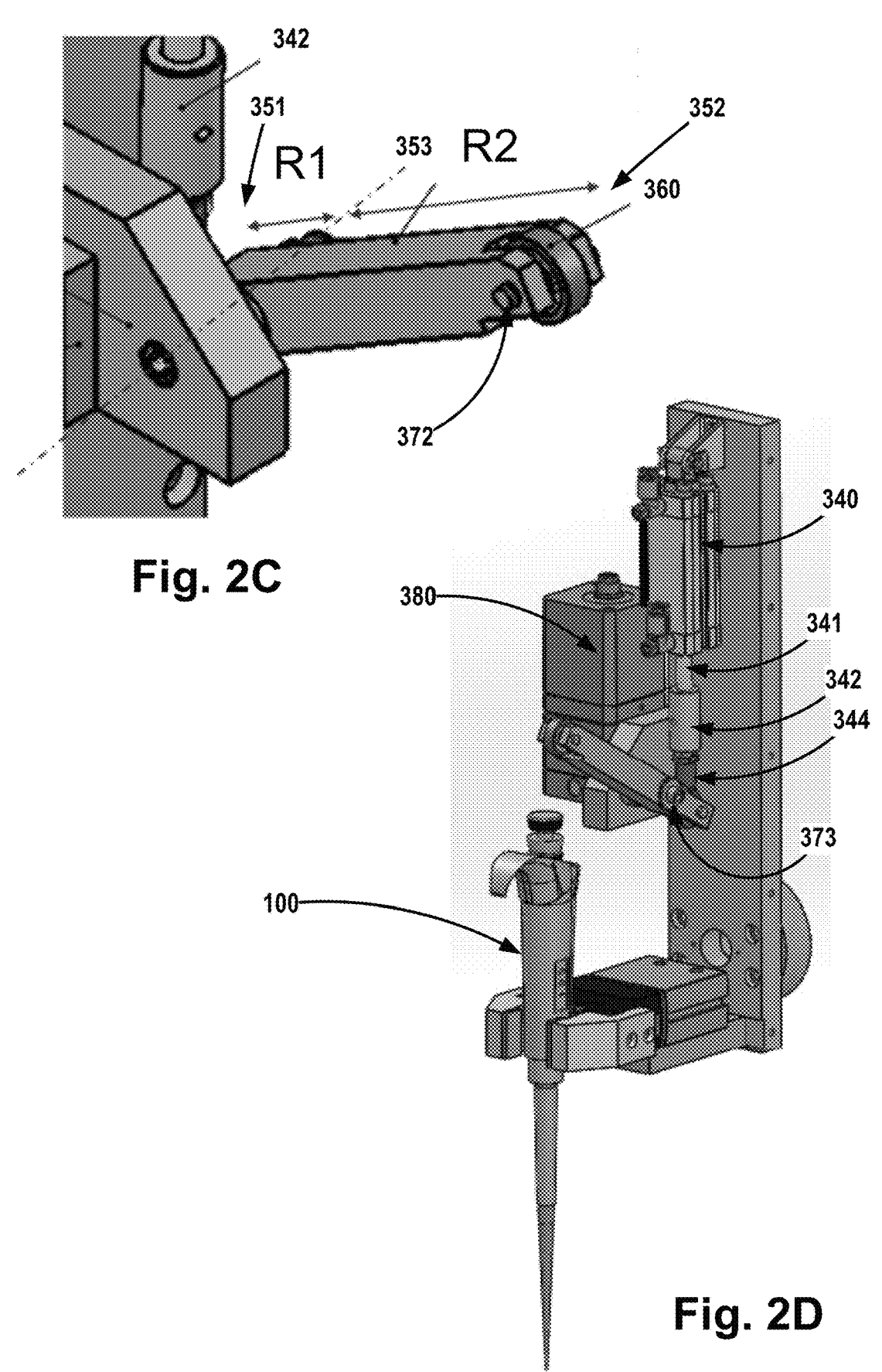
Figure 2E:
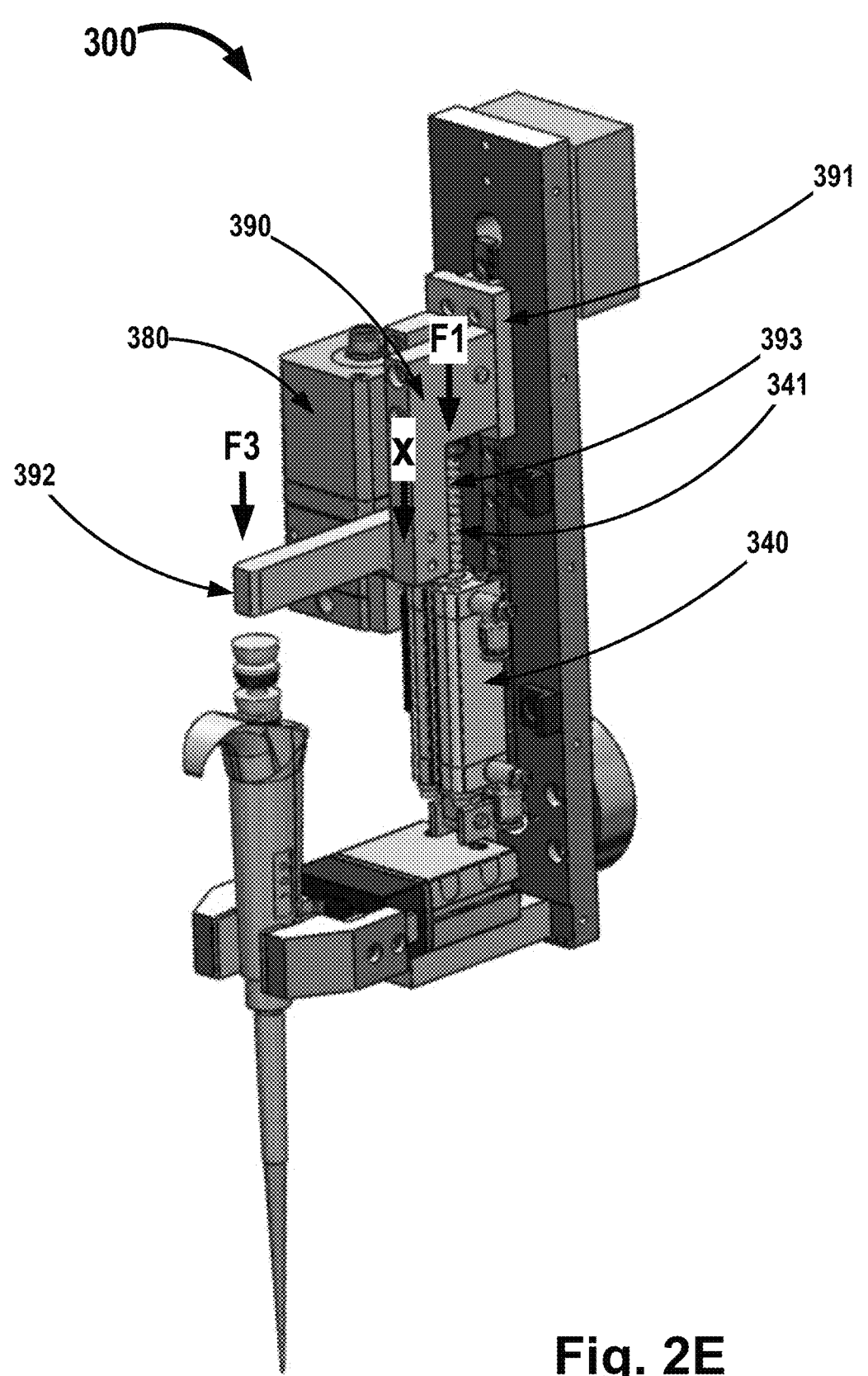
Figure 2F:
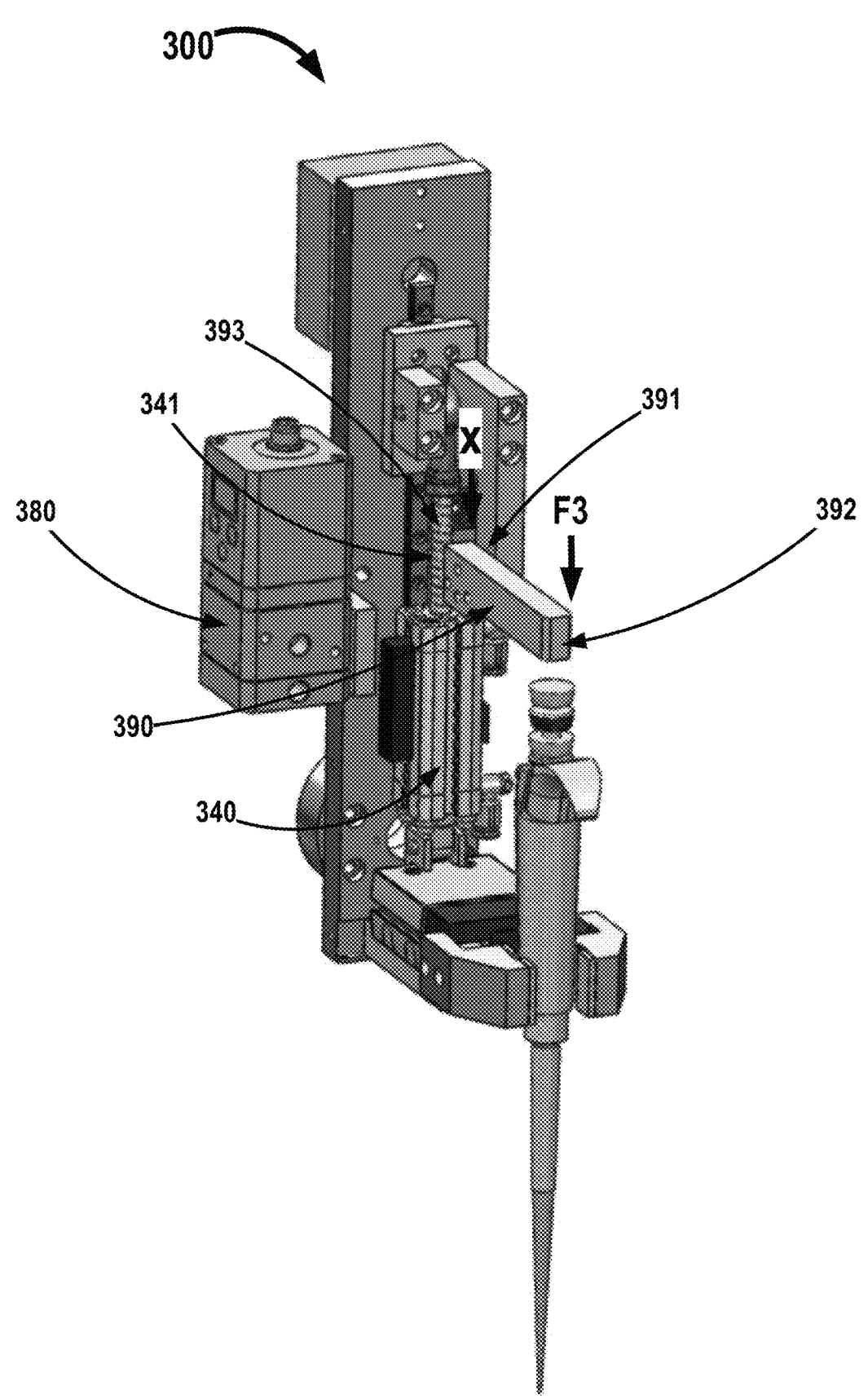

According to some embodiments, and as demonstrated in FIGS. 2E and 2F (two views), the pressing-device 300 comprises:

a firm base 310, a linear actuating-device 340 firmly connected to the base, and configured to provide linear motion and a force (F1), both in the same direction, via its actuating-lever 341;

a pressing-lever 390, firmly connected at a proximal-section thereof 391 to the actuating-lever 341; the pressing-lever is configured to temporarily communicate, via a distal-section thereof 392, with the plunger-button and therefore apply a force on the plunger-button.

According to some embodiments, and as demonstrated in FIGS. 2E and 2F, at least one spring 393 is provided to control and/or restrain the motion of the actuating-lever 341. According to some embodiments, the force (F3) applied onto the plugger-button depends on the spring's stiffness coefficient (k), $F3=F1-k\ x$; where (x) is the spring's deformation length, due to the motion of the actuating-lever 341.

According to some embodiments, the pipette is being firmly held by a third party. According to some embodiments, the pipette is being firmly held by the firm base of the pressing-device, optionally via a gripping element.

According to some embodiments, the plunger button applied force F2 or F3 is configured to push the plunger's button towards the plunger, and where the third party or the griping-device, which is connected to the firm base, provides the reaction force to the applied F2 or F3.

According to some embodiment, the linear actuating-device is selected from: linear motion engine, linear servo-motor, linear actuator, servo actuator.

According to some embodiments, the distal-section of the pressing-lever 352 or 392 further comprises a wheel 360 or a ball in a socket, via an axis pin 372, configured for the temporary communication of the pressing-lever with the plunger-button. Accordingly, the wheel is configured to apply the force F2 or F3 on to the plunger-button 130. The wheel is configured to allow a motion to the contact point 354 between the pressing-lever's distal section and the plunger-button. Accordingly, for the case of pressing-lever 350 (demonstrated in FIGS. 2A-2D), R1 is the distance between the axis pin at the proximal-section 371 and the axis pin at the predetermined location 373; and R2 is the distance between the axis pin 372 at the distal-section and the axis pin the predetermined location 373.

According to some embodiments, the linear actuating-lever 341 comprises a piston-spacer 342, configured to reduce the amplitude of the actuating-lever's motion.

According to some embodiments, the pressing device is configured to be firmly connected to a robotic arm 200, as an end effector 210 thereof.

According to some embodiments, the pressing-device further comprises at least one processor 399, configured to control the actuating-device, via a wired—and/or wireless—communication.

According to some embodiments, the linear actuating-device 340 further comprises an analog location tracker 381, in wired and/or wireless communication with the processor, configured to measure the motion of the actuating-lever, optionally its current length and/or location.

According to some embodiments, the pressing-device further comprising a pressure regulator 380, in wired and/or wireless communication with the processor, configured to measure and control the force (F1), applied via the actuating-device 340 on the actuating-lever 341.

According to some embodiments, the pressure regulator 380 is configured to control the actuating-device applied force (F1) and thereby control the force (F2 or F3), which is configured to push the plunger-button to a first stop and/or a second stop thereof. According to some embodiments, the first stop of a plunger-button is configured to allow the drawing of liquid into the pipette vessel and the second stop is configured to allow a dispensing of liquid out of the pipette vessel.

According to some embodiments, the control of the actuating-device is based on input data provided to the processor 399 from at least one of: the pressure regulator 380, analog location tracker 381, and any combination thereof According to some embodiments, the force applied onto the plunger button (F2 or F3) is selected between: 0 to 11 Kg. According to some embodiments, the resolution of the applied force (F2 or F3) is selected between: 0.001 to 0.5 Kg.

According to some embodiments, the pressing-device further comprising a gripping-device 320, firmly connected to the firm base and configured to firmly and temporarily hold the pipette. According to some embodiments, the griping-device comprises at least one of:

jaws or claws 322, configured grasp by direct impact upon pipette; in certain embodiments the jaws or claws comprise rubber or another elastic material 325 configured to at least partially adjust to the shape of the pipette being held;

at least one attraction-element configured to temporarily provide attraction forces applied to the pipette surface, forces selected from: vacuum, magneto-adhesion, or electro-adhesion;

at least one adhesion-element configured to be temporarily attached to the pipette by: a glue or surface tension; and any combination thereof.

According to some embodiments, the processor/s 399 is/are further configured to control the gripping-device 320, via wired—and/or wireless—communication.

Figure 3A:
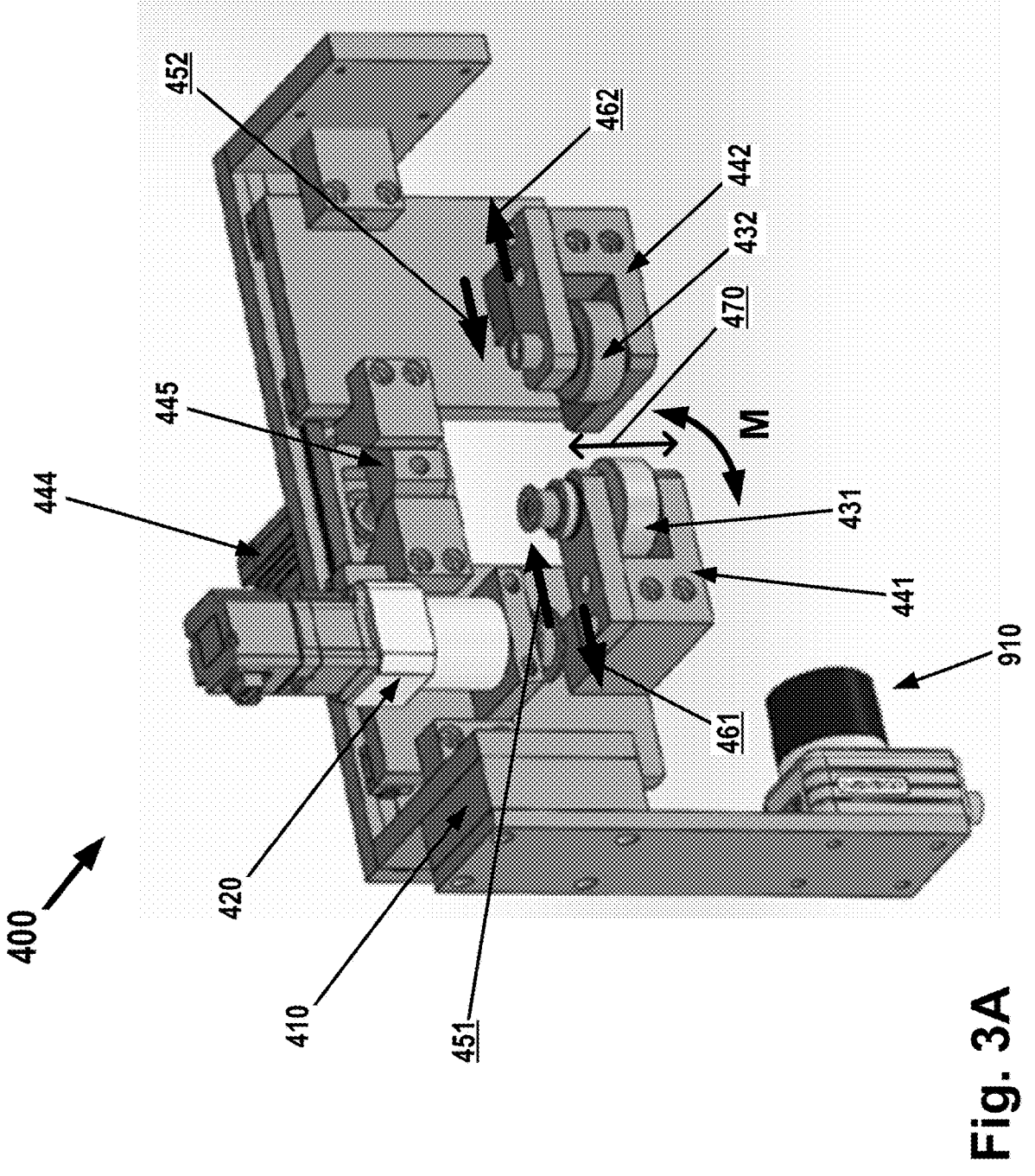
FIGS. 3A, 3B and 3C schematically demonstrate a new rotating-device, configured to turn or to dial a wheel-button of a pipette, according to some embodiments of the invention.
Figure 3B:
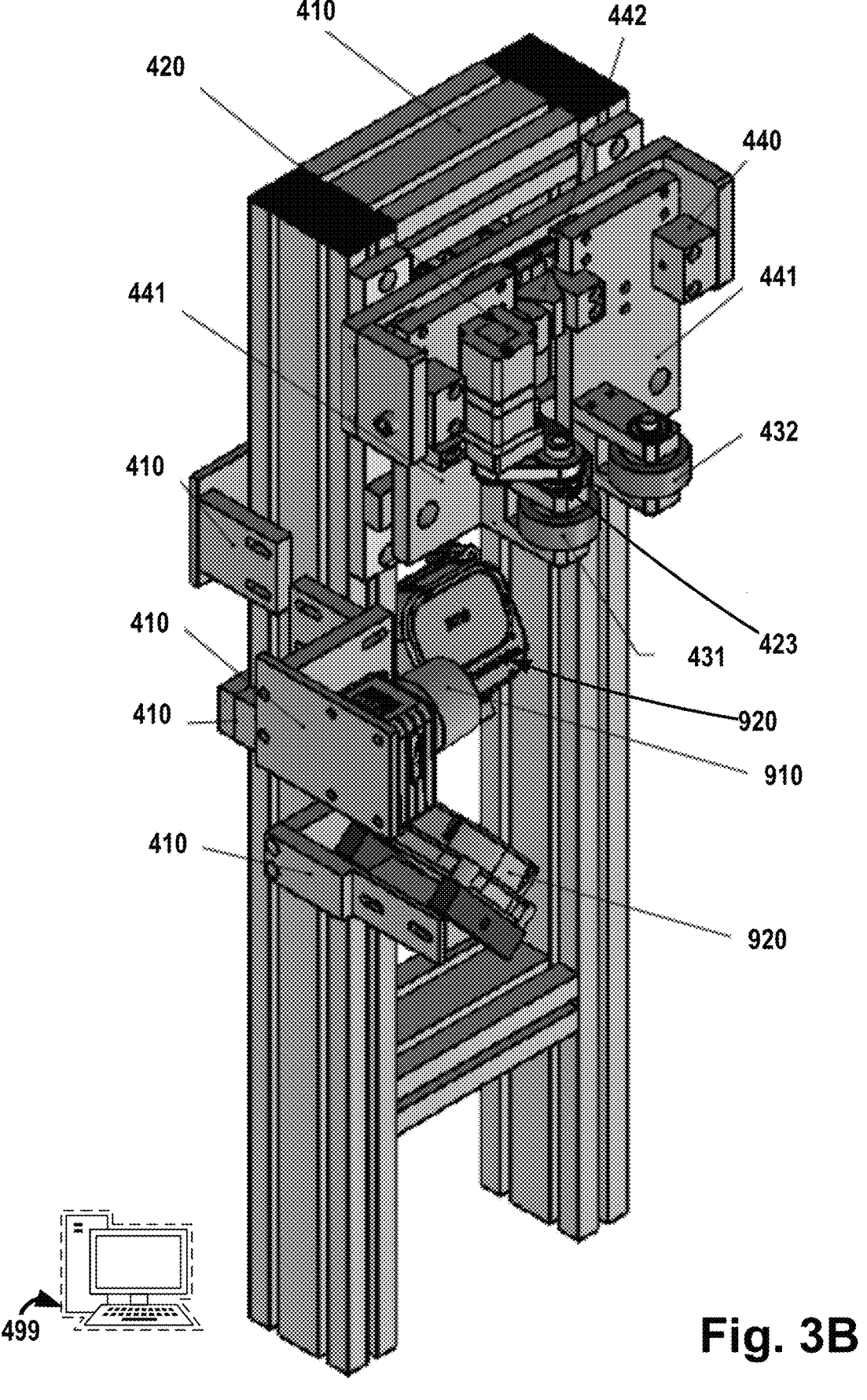
Figure 3C:
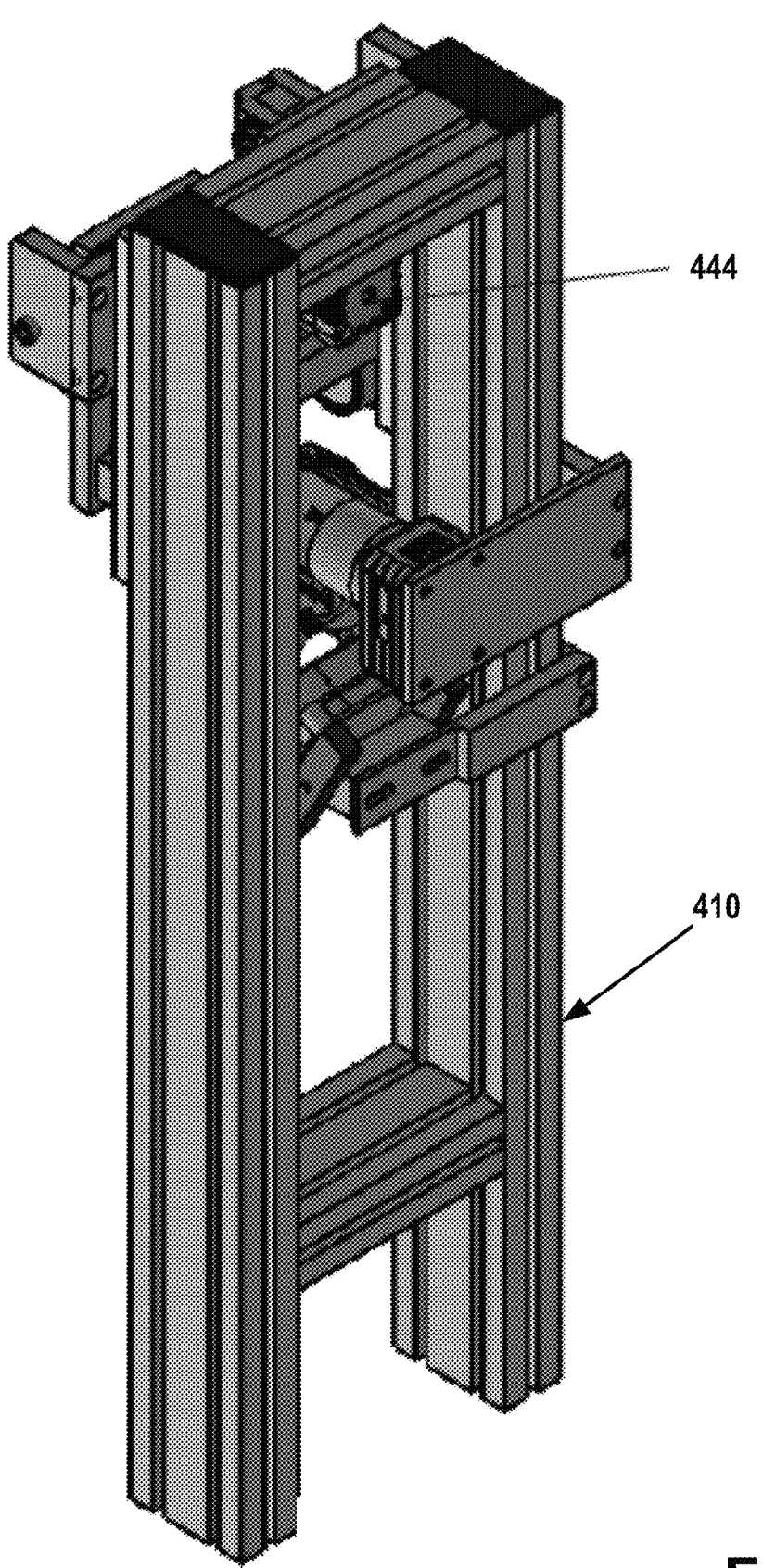

Reference is now made to FIGS. 3A, 3B, and 3C, which schematically demonstrate a new rotating-device 400, configured to turn or to dial a wheel-button 140 of a pipette 100, according to some embodiments of the invention, while the pipette is being held firmly. The rotating-device comprising:

a firm base 410;

a rotary-motor 420, configured to provide a rotary motion and force moment (M);

at least one first-wheel 431, in rotary communication with the rotary-motor, configured to apply the moment (M) onto the wheel-button and turn or dial the wheel-button, and therefore configured to adjust the volume of the pipette; in certain embodiments, the moment (M) is provided by the rotary motor to the first wheel, via a timing belt 423 located on its axis, as demonstrated in FIG. 3B;

a coupling-assembly 440 mounted via a rail on the firm base, configured to carry the rotary-motor and the first-wheel and to couple the first-wheel to the wheel-button and/or to separate the first-wheel from the wheel-button, and therefore to control the application of the moment (M) onto the wheel-button.

According to some embodiments, the turn or dial the wheel-button is configured to modify the volume of the pipette vessel.

According to some embodiments, the pipette is being firmly held by a third party, optionally via a gripping element. According to some embodiments, the pipette is being firmly held by the firm base of the rotating-device, optionally via a gripping element, similar to the above mentioned gripping-device.

According to some embodiments, the coupling assembly allows a linear motion to the first-wheel 431 in a direction which is perpendicular to its axis, as demonstrated in FIG. 3A with arrows 451 and 461. Accordingly, the coupling assembly allows the motion of the first wheel towards (arrow 451) the wheel-button and/or away (arrow 461) from the wheel-button, and thereby the application—and/or removal—of the force moment respectively onto—and/or off—the wheel-button of the pipette. According to some embodiments, a compression force is applied onto the wheel-button (in the direction of the arrows 451,452), applied by the motion of the coupling device, via the first wheel, from one side and resisted by the gripping element from the other side, such that the force moment (M) can be applied onto the wheel-button, by the rotary-motor, if activated.

According to some embodiments, the application and/or removal of the force moment respectively onto—and/or off—the wheel-button of the pipette can be controlled be by respectively an activation—and/or deactivation—of the rotary-motor.

According to some embodiments, the coupling-assembly comprises two opposing-sections, both mounted via the rail of the firm base, the first-section 441 is configured to carry the rotary-motor and at least one first-wheel, and the second-section 442 is configured to carry at least one second-wheel 432; and wherein the coupling-assembly is configured to couple both the first-wheel and the second-wheel from two sides of the wheel-button of the pipette.

According to some embodiments, the first-wheel is coupled to the rotary motor (therefore active-wheel) and the second-wheel 432 is a free rolling wheel (therefore passive-wheel), which is not connected to any actuator, but can roll by any coupled force and/or moment. According to other embodiments, both the first—and second—wheels are coupled to the rotary motor (active wheels).

FIG. 3A demonstrates that the coupling assembly allows the motion of the first—and second—wheels towards (arrows 451,452) the wheel-button and/or away (arrows 461, 462) from the wheel-button, and thereby the coupling and/or removal of the first—and second—wheels with—or from—the wheel-button of the pipette, respectively.

According to some embodiments, the coupling-assembly further comprises a compression-spring configured to bring the two opposing-sections 441,442 one towards the other, and therefore to apply a compression-force (in the direction of arrows 451,452) onto the wheel-button, via the first—and second—wheels, such that the force moment can be applied by the rotary-motor, if activated.

According to some embodiments, when the compression-force is applied, the first-wheel rotates the wheel-button; and the wheel-button rotates the second-wheel. According to other embodiments, both the first—and second—wheels rotate the wheel-button.

According to some embodiments, the coupling assembly further comprises a piston 444 which includes a piston-lever 445, as demonstrated in FIG. 3A. The piston-lever is located between the two opposing-sections 441,442, configured to separate the two opposing-sections, when the piston-lever protrudes out of the piston, and thereby release their coupling and the compression force, and stop the rotation or dialing of the wheel-button.

According to some embodiments, the first—wheel and/or the second—wheel are mounted to the coupling-assembly via a spring/s, configured to allow motion along the axis of the wheel/s. This motion along the wheel/s axis is configured to allow the wheel/s to move together with the wheel-button, when rotated/dialed and moving up/down relative to the pipette, as demonstrated in FIG. 3A with arrow 470.

According to some embodiments, the first-wheel and/or the second-wheel comprises rubber or another elastic material configured to at least partially adjust to the shape of the wheel-button being coupled.

According to some embodiments, the rotating-device further comprises at least one processor 499, configured to control via wired—and/or wireless—communication at least one of: the rotary-motor, the coupling-assembly, the gripping element, and any combination thereof; therefore, to control the rotation/dialing of the wheel-button.

According to some embodiments, the rotating-device further comprises a least one imaging-sensor 910, for example cameras at various locations. According to some embodiments, the least one imaging-sensor is in wired—and/or wireless—communication with the processor, configured to image and analyze the digits of a volume indicator 120 of the pipette (for a non-limiting example 4 to 6 digits) and optionally its indicated measuring unit.

According to some embodiments, the processor is further configured to analyze the provided image (digits and units) and to control the rotation of the wheel-button, based on the analyzed image, to a predetermined volume value.

According to some embodiments, the rotating-device further comprises an illumination element 920, configured to illuminate the volume indicator. According to some embodiment, the illumination element is configured with a location, orientation and intensity to provide optimal illumination condition to the display of the volume indicator.

According to some embodiments, the illumination element is in wired—and/or wireless—communication with the processor, and wherein the processor is further configured to analyze the provided image and to control the illumination element, based on the analyzed image.

Figure 1B:
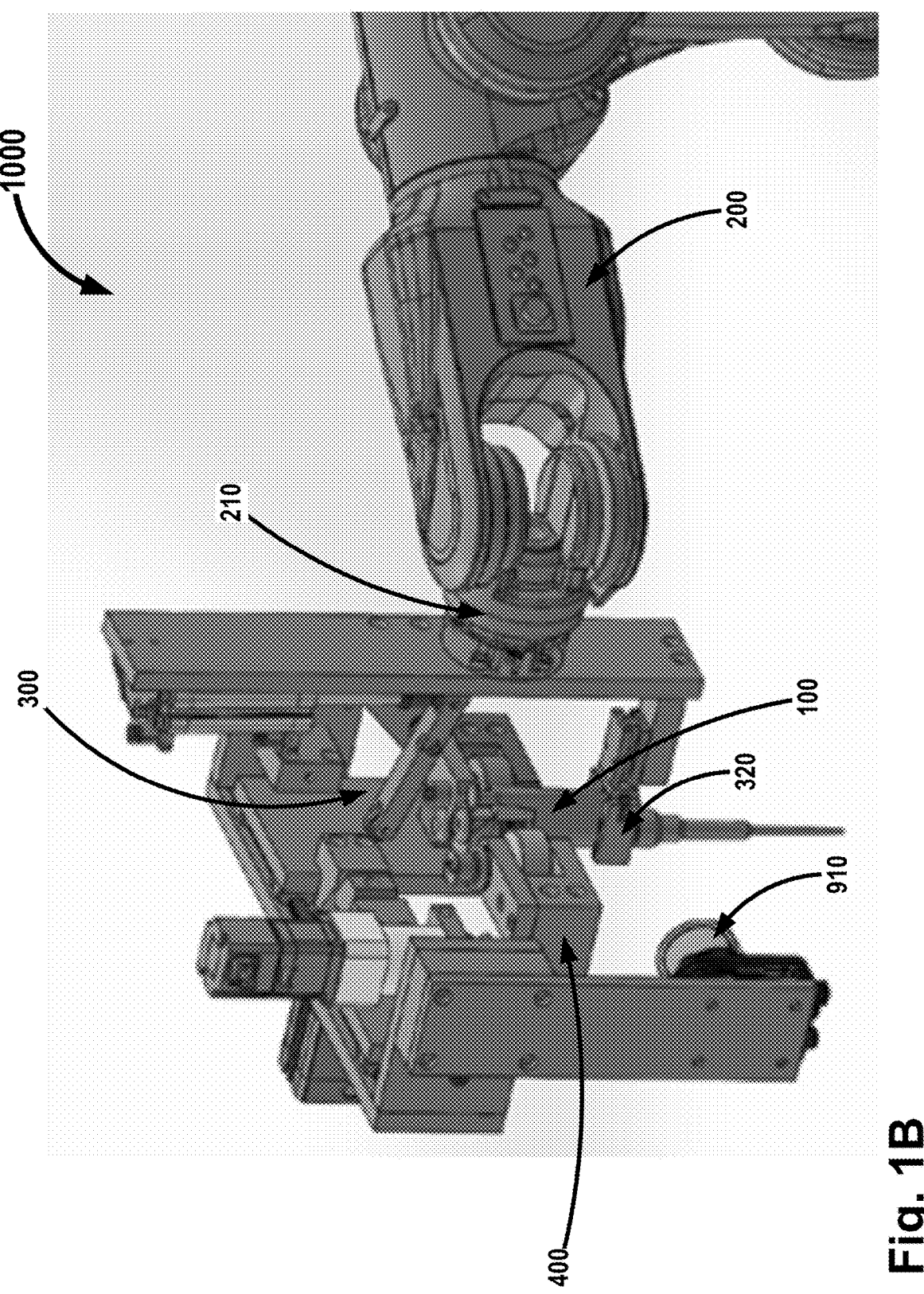
Figure 1C:
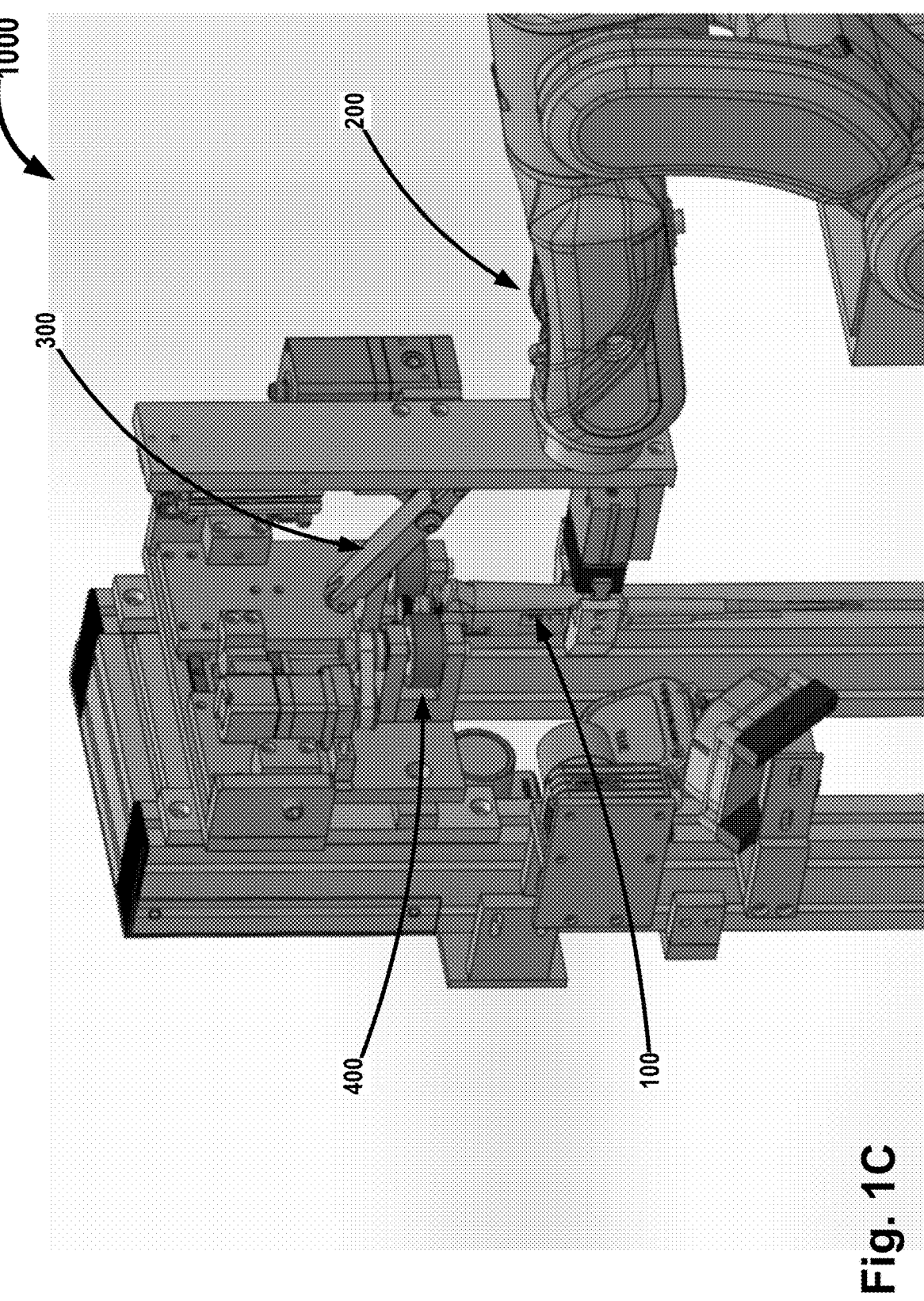

Reference is now made to FIGS. 1A, 1B, and 1C, which schematically demonstrate a new system 1000, configured to automatically calibrate a pipette 100 to a reference standard, according to some embodiments of the invention. The system 1000 comprising:

a robotic arm 200, configured to translate and rotate its end effector 210;

a pressing-device 300, according to at least some of the above mentioned embodiments, firmly connected to the robotic arm, to serve as its end effector, the pressing device configured to firmly hold a pipette and to press a plunger-button 130 of the pipette, and thereby control intake and/or disposal of liquid into—and/or out of—the pipette's vessel;

a rotating-device 400, according to at least some of the above mentioned embodiments, configured to rotate and/or dial a wheel-button 140 of the pipette, and thereby to control and adjust the volume of the pipette's vessel, and thereby the intake of the pipette;

at least one liquid source 500; optionally a controlled liquid source, for non-limiting examples: a connection to a liquid source, controlled water quality and/or temperature;

at least one scaling element 600, configured to measure weight, optionally via a container 610;

at least one input-device 700, configured to receive real-time input-data; and at least one processor 399,499,800, in wired—and/or wireless—communication with the input-device configured to analyze the input-data and accordingly to:

control the motion of the robotic arm, therefore control location and orientation of the pipette, and optionally enable loading the pipette with a tip 110;

control the rotating-device, therefore control a rotation angle/dialing applied onto the wheel-button and therefore set plunger's intake volume; in certain embodiments, the controlling is based on analyzed data from the image sensor, including currently displayed digits and their measurements unit;

control the pressing-device, therefore:

control pressure applied onto the plunger-button, and therefore control the actions of intaking and disposing of liquid to and from the pipette's vessel, and control the gripping and release of the pipette, via the gripping-device 320;

evaluate calibration of the pipette, in reference to a chosen standard; and output a calibration report for the pipette.

According to some embodiments, the system is provided on a stable table 901, configured to stand still in a direction perpendicular to the gravitational axis; optionally where at least some of the processors are remotely provided (not on the table). According to some embodiments the system is provided within a closed cabin 900, to enable the control of environmental conditions. In certain embodiments, the cabin comprises the stable table, as demonstrated in FIG. 1A. In certain embodiments, at least some of the processors are remotely provided, outside of the cabin. In certain embodiments, the cabin is at least partially transparent, to allow visual view of the system.

According to some embodiments, the processor's evaluation of the calibration comprises a determination of the deviation of the pipette's features from a standard so as to ascertain the proper correction factors. According to some embodiments, the standard can be predetermined, taken from known establishments (for a non-limiting example ISO 8655), and/or determined in real-time, according to user's selection.

According to some embodiments, the processor's output of the calibration comprises phrases such as: Pass, Fail, need Adjustment, Check for mechanical malfunction, and combination thereof. According to some embodiments the output report further comprises current status of the tested pipette, such as: the sensors measured features (temperate, humidity, barometric pressure, the average of the weight measurement). According to some embodiments, the processor is configured to record various parameters of the system, it's devices, and/or the cabin features, such as but not limited to: the applied pressure onto the plunger button (for filling the pipette tip and ejecting the liquid out), and required moment for rotating the wheel-button (for changing pipette's volume).

Figure 5B:
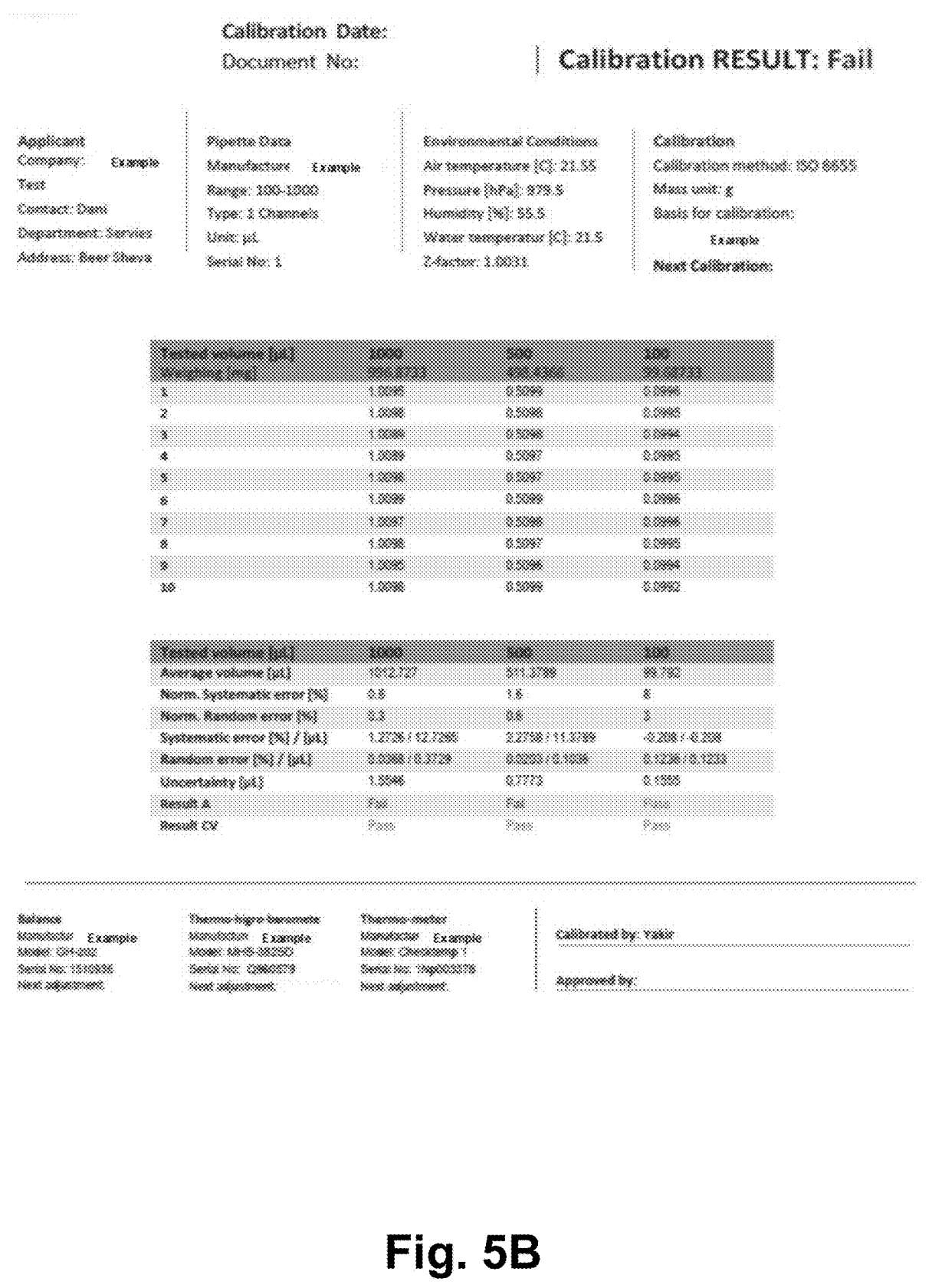

Non-limited examples for calibration reports are provided in: FIG. 5A for a positive result and FIG. 5B for a negative result, according to some embodiments of the invention.

According to some embodiments, the robotic arm comprises at least four rotational degrees of freedom (DOF) 201-206.

According to some embodiments, the input-device comprises at least one of: a keyboard (for manual input), a scanner (for bar-code and/or Q-code), a touch screen, a microphone (for voice recognition), a camera, a temperature sensor, a humidity sensor, a illumination sensor, a water density sensor, a sensor which determines the liquid quantity at the liquid source, an atmospheric pressure sensor, the scaling element, and any combination thereof, configured to collect data about the pipette features and/or the systems features.

According to some embodiments, input-device comprises at least one imaging-sensor 910, configured to take image/s of the pipette. According to some embodiments, the processor/s is/are further configured to evaluate a required rotation-angle or dialing, based on a received and analyzed image of the digits of the volume indicator 120, and optionally an indicated measuring unit.

According to some embodiments, the system further comprises at least one illumination element 920, configured to illuminate at least the volume indicator of the pipette. According to some embodiments, the input-device comprises at least one illumination sensor; and wherein the processor is further configured to accordingly control the illumination element, for a non-limiting example: turn on, turn off, adjust illumination intensity and/or color, adjust the orientation of the illumination element, and more.

According to some embodiments, the system further comprises at least one temperature control device, configured to adjust the cabin temperature and/or the liquid temperature in the liquid source; the input-device comprises at least one temperature sensor; and the processor is further configured to control the temperature control device to a predetermined temperature.

According to some embodiments, the system further comprises at least one humidity control device, configured to adjust the cabin's humidity; the input-device comprises at least one humidity sensor; and the processor is further configured to control the humidity control device to a predetermined humidity.

According to some embodiments, the input-data comprises at least one of:

at least one reference standard, to be provided as the predetermined standard;

identification data of the pipette, for a non-limiting example: manufacture, model, buttons location, plunger/vessel volume range, volume indicator's units, and more;

at least one image of the pipette, received from an imaging sensor;

at least one real-time image of the pipette's volume indicator (for example digits and measurement units), received from an imaging sensor;

real-time illumination intensity, received from an illumination sensor;

real-time cabin's temperature, received from a temperature sensor;

real-time liquid temperature in the liquid source, received from a temperature sensor;

real-time cabin's humidity, received from a humidity sensor;

real-time location and orientation of the pipette, received from a processor of the robotic arm;

real-time liquid weight, received from the scaling element;

real-time atmospheric pressure measurement;

real-time water density;

calculated Z factor, (which is a known measure of statistical effect size); and any combination thereof.

According to some embodiments, the system comprises at least one display device 710 and/or a printing device, configured to display the input data and/or the calibration report.

According to some embodiments, the plunger-button and the wheel-button are configured as a single button, that can be both pushed and rotated or dialed.

According to some embodiments, the system is configured to sequentially calibrate plurality of pipettes, one after the other, by collecting each pipette from a known location, calibrating each pipette, according to at least some of the above mentioned embodiments, returning the pipette to its original location or to another predetermined location, and then moving to collect the following pipette.

Figure 4:
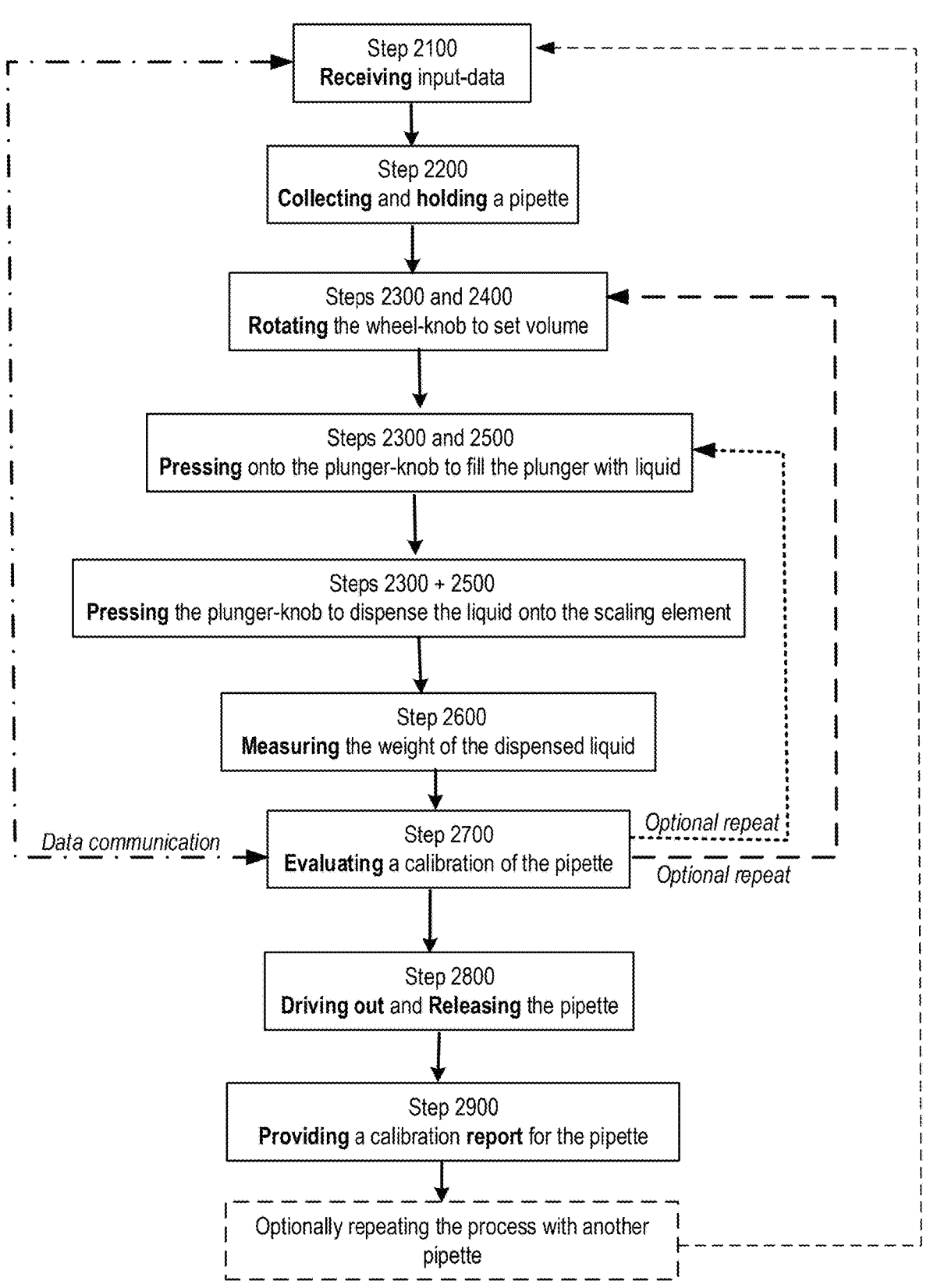
FIG. 4 schematically demonstrates a new method for automatic calibration of at least one pipette, according to some embodiments of the invention.

Reference is now made to FIG. 4, which schematically demonstrates a new method for automatic calibration of at least one pipette, using the system according to at least some of the above mentioned embodiments. The method comprising steps of:

receiving the input-data 2100, via the at least one input-device;

collecting from a collection station and firmly holding a pipette 2200, via the robotic arm and the gripping-device;

moving the pipette to a predetermined location and/or orientation 2300, via the robotic arm; for a non-limiting example, towards at least one of: the rotating-device, the liquid source, the scaling element, the returning location, and more; according to some embodiments the processor is configured for calculating current liquid surface line based on its initial volume and dimensions and the previous intakes, and/or based on its current weight, and accordingly control the moving of the pipette into the liquid source such that it is immersed/dipped to a predetermined depth.

applying a predetermined rotation angle onto a wheel-button of the pipette 2400, via the rotating-device;

applying a predetermined pressure onto a plunger-button of the pipette 2500, via the pressing-device; for a non-limiting example, apply pressure to a first stop to draw liquid from the liquid source and/or to apply pressure to a second stop to dispense the liquid within the plunger/vessel onto the scaling element;

measuring liquid weight 2600, via the scaling element;

evaluating a calibration of the pipette 2700, in reference to a predetermined standard, via the processor; and driving out and releasing the pipette 2800, via the robotic arm the gripping-device;

providing a calibration report for the pipette 2900, via the processor.

According to some embodiments, the step of moving the pipette to a predetermined location and/or orientation 2300, comprises loading the pipette with a tip.

According to some embodiments, the step of driving out and releasing the pipette 2800, comprises ejecting the tip from the pipette.

According to some embodiments, the steps loading and ejecting the tip can be provided between several measurements of a specific pipette, meaning loading a new tip before the step of measuring and ejecting the use tip, after the measurement.

According to some embodiments, the step 2400 of applying a predetermined rotation angle onto a wheel-button, comprises selecting a liquid volume for the pipette's vessel. According to some embodiments, the step of selecting a liquid volume for the pipette comprises analyzing, via the processor, an image of a volume indicator of the pipette, provided by an imaging sensor. According to some embodiments, the step of applying rotation angle onto a wheel-button is provided several times for several different volumes.

According to some embodiments, the step 2600 of applying a predetermined pressure onto the plunger-button, comprises applying pressure to a first stop for drawing liquid from the liquid source into the pipette. According to some embodiments, the step 2600 of applying a predetermined pressure onto the plunger-button, comprises applying pressure to a second stop for dispensing the liquid from the pipette onto the scaling element, or onto a container there onto the scaling element.

According to some embodiments, the method further comprising at least one step selected from:

controlling temperature of the cabin and/or of the liquid in the liquid source, via at least one temperature sensor and at least one temperature control device;

controlling humidity of the cabin, via at least one humidity sensor, and at least one humidity control device;

controlling the illumination onto a volume indicator of the pipette, via at least one illumination sensor and at least one illumination element;

the pipette via an ultra violet radiation device;

selecting a tip to be applied onto the pipette, according to the type of the pipette and its task;

collecting and applying a tip onto the pipette, via the robotic arm;

ejecting the tip from the pipette;

removing used liquid from the container;

displaying the input data and/or the calibration report, via the displaying-device and/or via the printing device; and and any combination thereof.

According to some embodiments, the step 2900 of driving out the pipette to a predetermined location, is not necessarily to its original collection point, but to a different location.

According to some embodiments, and as demonstrated in FIG. 4, the steps of drawing, dispensing and measuring, are optionally repeated in cycles, for a predetermined number of times, and optionally per several predetermined selected liquid volumes; and wherein the step of evaluating is based on a selected collection of the repeated cycles. According to some embodiments, the selecting of the collection of cycles, is based on statistic tools selected from: z factor, standard deviation, measurement random error, measurement uncertainty, etc.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system (1000) configured to automatically calibrate a pipette, comprising:

a robotic arm (200), configured to translate and rotate its end effector (210);

a pressing-device (300), firmly connected to the robotic arm, to serve as the end effector, the pressing device configured to hold a pipette and to press a plunger-button of the pipette;

a rotating-device (400), configured to rotate or dial a wheel-button of the pipette, comprising:

a firm base (410);

a rotary-motor (420), configured to provide a rotary motion and moment;

at least one active-wheel (431), in rotary communication with the rotary-motor, configured to apply the moment onto the wheel-button and turn or dial the wheel-button; and a coupling-assembly (440), mounted via a rail on the firm base, the coupling assembly is configured to translate along the rail relative to the firm base, to carry and move the rotary-motor and the at least one active-wheel towards and/or away from the wheel-button of the pipette and thereby to selectively couple the at least one active-wheel to the wheel-button and/or to separate the at least one active-wheel from the wheel-button, and therefore control the application of the moment onto the wheel-button;

at least one liquid source (500);

at least one scaling element (600), configured to measure weight;

at least one input-device (700), configured to receive real-time input-data; and at least one processor (399,499,800), in communication with the input-device configured to analyze the input-data and accordingly to:

control the motion of the robotic arm, and therefore control location and orientation of the pipette;

control the rotating-device, and therefore control a rotation angle or dialing applied onto the wheel-button;

control the pressing-device, and therefore control pressure applied onto the plunger-button and control the gripping and release of the pipette;

evaluate calibration of the pipette, in reference to a predetermined standard; and output a calibration report for the pipette.

2. The system of claim 1, wherein the system is provided within a closed cabin that is configured to enable environment control there within, with the exception that when the at least one processor comprises a plurality of processors, some of the plurality of processors are optionally provided outside of the closed cabin.

3. The system of claim 2, wherein:

the system further comprises at least one temperature control device, configured to adjust the cabin's temperature and/or the liquid's temperature in the liquid source;

the input-device comprises at least one temperature sensor; and the at least one processor is further configured to control the temperature control device to a predetermined temperature.

4. The system of claim 2, wherein:

the system further comprises at least one humidity control device, configured to adjust the cabin's humidity;

the input-device comprises at least one humidity sensor; and the at least one processor is further configured to control the humidity control device to a predetermined humidity.

5. The system of claim 2, wherein the input-data comprises at least one of:

at least one reference standard, to be provided as the predetermined standard;

identification data of the pipette;

at least one image of the pipette, received from an imaging sensor;

at least one current image of the pipette's volume indicator, received from an imaging sensor;

current illumination intensity, received from an illumination sensor;

current cabin's temperature, received from a temperature sensor;

current liquid temperature in the liquid source, received from a temperature sensor;

current cabin's humidity, received from a humidity sensor;

current location and orientation of the pipette, received from the at least one processor that controls the motion of the robotic arm;

current liquid weight, received from the scaling element;

current atmospheric pressure;

Calculated Z factor;

current water density; and any combination thereof.

6. The system of claim 1, wherein at least one of the following conditions is present:

the robotic arm comprises at least four rotational degrees of freedom;

the input-device comprises at least one of: a keyboard, a scanner, a touch screen, a microphone, a camera, a temperature sensor, a humidity sensor, an illumination sensor, a water density sensor, a sensor which determines the liquid quantity at the liquid source, the scaling element, an atmospheric pressure sensor, and any combination thereof, configured to collect data about the pipette features and/or the system's features;

the system further comprises at least one display device, configured to display the input data and/or the calibration report;

the plunger-button and the wheel-button are configured as a single button; and the report comprising any one of: pass, fail, need adjustment, check for mechanical malfunction, and combination thereof.

7. The system of claim 1, wherein the input-device comprises at least one imaging-sensor, configured to take an image(s) of the pipette.

8. The system of claim 7, wherein the at least one processor is further configured to evaluate a required rotation-angle or dialing, based on a received and analyzed image of digits of a volume indicator and optionally an indicated measuring unit.

9. The system of claim 7, further comprising at least one illumination element, configured to illuminate at least the volume indicator of the pipette.

10. The system of claim 9, wherein the input-device comprises at least one illumination sensor; and wherein the at least one processor is further configured to control the illumination element.

11. A method for automatic calibration of at least one pipette using the system according to claim 1, the method comprising:

receiving the input-data, via the at least one input-device;

holding and/or releasing a pipette, via the pressing-device;

moving the pipette to a predetermined location and/or orientation, via the robotic arm;

applying a predetermined rotation angle onto a wheel-button of the pipette, via the rotating-device;

applying a predetermined pressure onto a plunger-button of the pipette, via the pressing-device;

measuring liquid weight, via the scaling element;

evaluating a calibration of the pipette, in reference to a predetermined standard, via the at least one processor; and providing a calibration report for the pipette, via the at least one processor and a display device.

12. The method of claim 11, wherein the step of applying a predetermined rotation angle onto a wheel-button, comprises selecting a liquid volume for the pipette; and wherein the step of selecting a liquid volume for the pipette comprises analyzing, via the at least one processor, an image of a volume indicator of the pipette, provided by an imaging sensor.

13. The method of claim 11, wherein the step of applying a predetermined pressure onto the plunger-button, comprises drawing liquid from the liquid source into the pipette.

14. The method of claim 13, wherein the step of applying a predetermined pressure onto the plunger-button, comprises dispensing the liquid from the pipette onto the scaling element.

15. The method of claim 14, wherein the steps of drawing, dispensing, and measuring, are repeated in cycles, for a predetermined number of times, per several predetermined selected liquid volumes; and wherein the step of evaluating is based on a selected collection of the repeated cycles.

16. The system of claim 1, wherein the coupling-assembly further comprises two opposing-sections configured to move towards (451,452) and/or away (461,462) from each other, the first-section is configured to carry the rotary-motor and the at least one active-wheel, and the second-section is configured to carry another at least one active-wheel or a passive-wheel, and wherein the coupling-assembly is configured to couple and/or separate all the wheels from two opposing sides of the wheel-button.

17. The system of claim 16, wherein the coupling-assembly further comprises a compression-spring configured to bring the two opposing-sections one towards the other, and therefore to apply a compression-force onto the wheel-button.

18. The system of claim 16, wherein the coupling-assembly further comprises a piston comprising a piston-lever; the piston-lever located between the two opposing-sections, configured to separate the two opposing-sections, when the piston-lever protrudes out of the piston.

19. The system of claim 16, wherein at least one of the following conditions is present:

the at least one active-wheel and/or the passive-wheel comprises rubber;

the rotating-device further comprising the at least one processor that is configured to control the rotary-motor and/or the coupling-assembly, and therefore to control the rotation or dialing of the wheel-button;

the rotating-device further comprising at least one imaging-sensor, in communication with the at least one processor, configured to image digits of a volume indicator of the pipette and optionally its indicated measuring unit, and optionally wherein the at least one processor is further configured to analyze the provided image and to control the rotation of the wheel-button, based on the analyzed image, to a predetermined value;

the rotating-device further comprising an illumination element, configured to illuminate the volume indicator; and the rotating-device further comprising a gripping-device, firmly connected to the firm base and configured to firmly and temporarily hold the pipette.

20. The system of claim 16, wherein the at least one active-wheel and/or the passive-wheel is mounted to the coupling-assembly via a spring(s), configured to allow motion along the axis (470) of the at least one active-wheel and/or the passive-wheel.

*     *     *     *     *